United States Patent Office 3,428,736
Patented Feb. 18, 1969

3,428,736
SYNERGISTIC COMBINATION CONTAINING AN OXIODINIUM COMPOUND AND BIS-(3,5,6-TRI-CHLORO-2-HYDROXYPHENYL)METHANE
William N. Cannon, Greenwood, Ind., assignor to Eli Lilly and Company, Indianapolis, Ind., a corporation of Indiana
No Drawing. Continuation-in-part of application Ser. No. 338,025, Jan. 16, 1964. This application July 26, 1967, Ser. No. 656,067
U.S. Cl. 424—340      4 Claims
Int. Cl. A61k 27/02

ABSTRACT OF THE DISCLOSURE

Synergistic combinations of bactericides containing bis-(3,5,6-trichloro - 2 - hydroxyphenyl)methane and a dibenz[be][1,4]oxiodinium salt are disclosed.

CROSS-REFERENCE

This application is a continuation-in-part of my copending application Ser. No. 338,025, filed Jan. 16, 1964, now abandoned.

BACKGROUND OF THE INVENTION

There are many bactericides known which have a broad spectrum of activity against a wide variety of microorganisms, including both Gram positive and Gram negative bacteria and fungi. Among these bactericides are presently numbered various dibenzoxiodinium compounds which have shown an outstanding bacteriostatic or bactericidal activity against many of the commoner pathogenic bacteria and fungi. In general, among the known bactericides, the more active ones are more toxic and/or more irritating to skin than those with lesser activity; that is to say, the antibacterial activity of these compounds is more or less paralleled by their toxicity. As a consequence, there has been a need to find combinations of bactericides with excellent bactericidal effect in which the effective concentrations of the individual bactericides in the combination are one-quarter or less of those required when the bactericides are used alone. In addition, there has always been the hope that some synergistic action would be found between different bactericides. Of particular interest has been the attempt to find bactericidal combinations showing a synergistic effect against Gram positive pathogens such as those which may be found on the human skin. In these synergistic combinations, it was hoped that each bactericide could be present at a concentration which would neither irritate the skin nor interfere with healing processes, as had commonly been the case when the bactericide was used alone.

The dibenz[be][1,4]oxiodinium salts and their use as microbiocides are disclosed in my copending application Ser. No. 654,656, filed July 19, 1967, a continuation-in-part of copending application Ser. No. 270,545, filed Apr. 4, 1963, now abandoned. Bis-(3,5,6-trichloro-2-hydroxyphenyl)methane is a well-known bactericide commonly referred to as hexachlorophene.

SUMMARY

This invention provides synergistic bactericidal combinations comprising bis-(3,5,6-trichloro-2-hydroxyphenyl)methane (hexachlorophene) plus a dibenz[be][1,4]oxiodinium salt represented by the following formula:

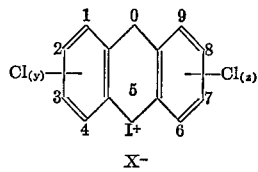

wherein $y$ and $z$ are 0 or 1 and $X^-$ is an anion.

Anions represented by $X^-$ in the above formula include all the conventional inorganic anions, as for example: sulfates, sulfites, nitrate, phosphates, halides, $C_1$–$C_{10}$ aliphatic carboxylates, $C_2$–$C_{10}$ aliphatic dicarboxylates, $C_2$–$C_5$ α-hydroxyalkanoates, $C_4$–$C_6$ α-hydroxyalkanedioates, benzoates, phthalates, benzenesulfonates, phenyl $C_2$–$C_4$ alkanoates, phenates, citrate, carbonates, $C_1$–$C_3$ alkylsulfonates, and naphthylenesulfonates. Thus, anions represented by $X^-$ include sulfates, such as sulfate, pyrosulfate, and bisulfate; sulfites, such as sulfite and bisulfite; nitrate; phosphates, such as phosphate, monohydrogenphosphate, dihydrogenphosphate, metaphosphate and pyrophosphate; halides, such as chloride, bromide, iodide and fluoride; $C_1$–$C_{10}$ aliphatic carboxylates, such as acetate, propionate, decanoate, caprylate, acrylate, formate, isobutyrate, caprate, heptanoate and propiolate; $C_2$–$C_{10}$ aliphatic dicarboxylates, such as oxalate, malonate, succinate, suberate, sebacate, fumarate, maleate, butyne-1,4-dioate and hexyne-1,6-dioate; benzoates, such as benzoate, chlorobenzoate, methylbenzoate, dinitrobenzoate, hydroxybenzoate and methoxybenzoate; phthalates, such as phthalate and terephthalate; benzenesulfonates, such as toluenesulfonate, chlorobenzenesulfonate and xylenesulfonate; phenyl $C_2$–$C_4$ alkanoates, such as phenylacetate, phenylpropionate and phenylbutyrate; citrate; $C_2$–$C_5$ α-hydroxyalkanoates, such as lactate, β-hydroxybutyrate and glycollate; $C_4$–$C_6$ α-hydroxyalkanedioates, such as malate and tartrate; phenate; carbonates, such as carbonate and bicarbonate; $C_1$–$C_3$ alkylsulfonates, such as methanesulfonate and propanesulfonate; and naphthalenesulfonates, such as naphthalene-1-sulfonate and naphthalene-2-sulfonate.

Representative compounds coming within the scope of the above formula include the following:

2,4-dichlorodibenz[be][1,4]oxiodinium chloride
3,7-dichlorodibenz[be][1,4]oxiodinium bromide
2,8-dichlorodibenz[be][1,4]oxiodinium dihydrogen phosphate
4-chlorodibenz[be][1,4]oxiodinium bisulfite
4,6-dichlorodibenz[be][1,4]oxiodinium nitrate
3,7-dichlorodibenz[be][1,4]oxiodinium iodide
bis-(2-chlorodibenz[be][1,4]oxiodinium)monohydrogen phosphate
1-chlorodibenz[be][1,4]oxiodinium benzoate
3-chlorodibenz[be][1,4]oxiodinium tosylate, and the like.

The oxiodinium salts useful in the synergistic combinations of this invention are readily prepared by the procedures set forth in my copending application Ser. No. 654,656, filed July 19, 1967, a continuation-in-part of copending application Ser. No. 270,545, filed Apr. 4, 1963, now abandoned. According to these procedures, an o,o-diaminodiphenyl ether is tetra-azotized and the tetra-azonium compound is decomposed in the presence of sodium iodide to yield the corresponding dibenzoxiodinium iodide. Alternatively, a suitably substituted diphenyl ether can be reacted with iodosyl sulfate in concentrated sulfuric acid to yield the desired dibenzoxiodinium sulfate. Still further methods of preparation involve the oxidation of a suitably substituted 2-iodobiphenyl ether with peracetic acid to yield the desired dibenzoxiodinium compound, usually in the form of a sulfate or bisulfate salt, or the chlorination of a 2-iododiphenyl ether to yield a dichloroiodo compound which can be hydrolyzed to an iodoso derivative, readily converted to an oxiodinium compound by treatment with acid.

The synergistic bactericidal effect produced by combinations of an oxiodinium compound represented by the above formula with hexachlorophene has been readily demonstrated by the following procedure, described in Applied Microbiology 8, 1 (1960): An assay medium was prepared by mixing 1.5 g. of beef extract, 6 g. of peptone, 6 g. of yeast extract, 4 g. of N,Z-casein hydrolysate, 20 g. of agar, an appropriate aliquot of an aqueous solution of the bactericide or bactericides to be tested, and a sufficient quantity of water to make 1 liter. A quantity of the medium was prepared without bactericide to serve as a control. The completed media were sterilized, poured hot into Petri dishes, and allowed to cool. After the poured plates had hardened, they were streak inoculated with a 24-hour culture of *Staphylococcus aureus* grown in nutrient broth. The plates were incubated overnight at 37° C. and were then observed for the presence or absence of any growth of the bacteria.

In a typical test bis-(3,7-dichlorodibenz[be][1,4]oxiodinium)sulfate was employed as the oxiodinium compound in synergistic combination with hexachlorophene. The results of this test are given in Tables 1–2 which follow. In Table 1, the first column gives the results when bis-(3,7 - dichlorodibenz[be][1,4]oxiodinium)sulfate was tested alone at concentrations ranging from 1 p.p.m. to 2 p.p.m., and column 2 gives the results when hexachlorophene was tested alone at concentrations ranging from 0.05 to 0.4 p.p.m.

Table 2 reports similar data on combinations of bis-(3,7-dichlorodibenz[be][1,4]oxiodinium)sulfate and hexachlorophene. In Table 2, column 1 gives the concentration of bis-(3,7 - dichlorodibenz[be][1,4]oxiodinium)sulfate in the combination, column 2 the fraction of the minimum inhibitory concentration (MIC) of the oxiodinium compound, column 3 the concentration of hexachlorophene in the combination, column 4 the fractional MIC of hexachlorophene, and column 5 the observed growth of *S. aureus* at the designated concentrations.

In the tables which follow, a "+" sign indicates that bacterial growth was observed and a "−" sign that no growth was observed.

TABLE 1

| Bactericide Conc., p.p.m. | Observed Growth of *S. aureus* | |
|---|---|---|
| | Oxiodinium | Hexachlorophene |
| 2.0 | − | |
| 1.8 | + | |
| 1.6 | + | |
| 1.4 | + | |
| 1.2 | + | |
| 1.0 | + | |
| 0.6 | | − |
| 0.4 | | − |
| 0.2 | | + |
| 0.1 | | + |
| 0.05 | | + |

In Table 1, the MIC of the oxiodinium compound is 2.0 p.p.m. and the MIC of hexachlorophene is 0.6 p.p.m.

TABLE 2

| Hexachlorophene | | Bis-(3,7-dichlorodibenz[be][1,4]oxiodinium sulfate | | Observed growth of *S. aureus* |
|---|---|---|---|---|
| Concentration, p.p.m. | Fractional MIC | Concentration, p.p.m. | Fractional MIC | |
| 0.2 | 1/3 | 1.2 | 6/10 | − |
| 0.2 | 1/3 | 1.0 | 1/2 | − |
| 0.2 | 1/3 | 0.5 | 1/4 | − |
| 0.2 | 1/3 | 0.25 | | + |
| 0.2 | 1/3 | 0.125 | | + |
| 0.1 | 1/6 | 1.6 | 8/10 | − |
| 0.1 | 1/6 | 1.4 | 7/10 | − |
| 0.1 | 1/6 | 1.2 | 6/10 | − |
| 0.1 | 1/6 | 1.0 | 1/2 | − |
| 0.1 | 1/6 | 0.5 | 1/4 | − |
| 0.1 | 1/6 | 0.25 | | + |
| 0.1 | 1/6 | 0.125 | | + |
| 0.05 | 1/12 | 1.6 | 8/10 | − |
| 0.05 | 1/12 | 1.4 | 7/10 | − |
| 0.05 | 1/12 | 1.2 | 6/10 | − |
| 0.05 | 1/12 | 1.0 | 1/2 | − |
| 0.05 | 1/12 | 0.5 | 1/4 | − |
| 0.05 | 1/12 | 0.25 | | + |
| 0.05 | 1/12 | 0.125 | | + |
| 0.025 | 1/24 | 1.6 | 8/10 | − |
| 0.025 | 1/24 | 1.4 | 7/10 | − |
| 0.025 | 1/24 | 1.2 | 6/10 | − |
| 0.025 | 1/24 | 1.0 | 1/2 | − |
| 0.025 | 1/24 | 0.5 | | + |
| 0.025 | 1/24 | 0.25 | | + |
| 0.025 | 1/24 | 0.125 | | + |

Table 3 below lists the minimum concentrations at which other oxiodinium compounds in combination with hexachlorophene inhibited the growth of *S. aureus* and the fractional MIC corresponding to each actual concentration. The table also lists the minimal concentrations at which the individual bactericides inhibited the growth of *S. aureus*. The experimental conditions from which the data in Table 3 were derived were similar in all respects to those described for Tables 1–2.

TABLE 3

| Bactericides | Minimum inhibitory concentrations *S. aureus* |
|---|---|
| Dibenz[be][1,4]oxiodinium chloride alone | 8.0 p.p.m. |
| Hexachlorophene alone | 0.4 p.p.m. |
| Dibenz[be][1,4]oxiodinium chloride | 5.0 p.p.m. (5/8 MIC)..... 4.0 p.p.m. (1/2 MIC).... 3.0 p.p.m. (3/8 MIC). |
| with Hexachlorophene | 0.025 p.p.m. (1/16 MIC).. 0.05 p.p.m. (1/8 MIC)..... 0.1 p.p.m. (1/4 MIC). |
| 1-chlorodibenz[be][1,4]oxiodinium chloride alone | 2.0 p.p.m. |
| Hexachlorophene alone | 0.6 p.p.m. |
| 1-chlorodibenz[be][1,4]oxiodinium chloride | 1.0 p.p.m. (1/2 MIC)..... 1.6 p.p.m. (8/10 MIC).... |
| with Hexachlorophene | 0.1 p.p.m. (1/6 MIC)..... 0.05 p.p.m. (1/12 MIC)... |
| 3-chlorodibenz[be][1,4]oxiodinium chloride alone | 1.4 p.p.m. |
| Hexachlorophene alone | 0.6 p.p.m. |
| 3-chlorodibenz[be][1,4]oxiodinium chloride | 0.5 p.p.m. (5/14 MIC) |
| with Hexachlorophene | 0.05 p.p.m. (1/12 MIC) |

It can be seen from Table 2 above that combinations containing from 1/3 to 1/24 MIC of hexachlorophene plus from 1/4 to 8/10 MIC of bis-(3,7-dichlorodibenz[be][1,4]oxiodinium)sulfate completely suppressed the growth of *S. aureus*. Similarly, according to Table 3, combinations containing from 1/16 to 1/4 MIC of hexachlorophene and 5/8 to 3/8 MIC of dibenz[be][1,4]oxiodinium chloride suppressed the growth of *S. aureus* as did combinations containing 1/6 to 1/12 MIC of hexachlorophene and 1/2 to 8/10 MIC of 1-chlorodibenz[be][1,4]oxidodinium chloride. Similar results were obtained with the corresponding 3-chloro compound plus hexachlorophene. The above combinations containing the said fractional MIC's of hexachlorophene and of the oxiodinium compounds constitute synergistic combinations fully capable of preventing the growth of *S. aureus* at concentrations of each bactericide which are unexpectedly lower than the MIC and in no case does the sum of the minimum inhibitory combination of hexachlorophene and of the oxiodinium compound in the combination exceed 1.0.

It can be seen from the above tables that there is a considerable range of effectiveness in terms of ratios for synergistic bactericidal combinations of a dibenz[be][1,4]oxiodinium compound with hexachlorophene. In general, it is preferred to use more of the oxiodinium compound than of either of the other bactericides. For example, ratios of oxiodinium compound to hexachlorophene as high as 32:1 or 64:1 give excellent microbial control. On the other hand, hexachlorophene can be present in excess in the synergistic compositions of this invention and this excess can be as high as twice the amount of oxiodinium compound present. Generally speaking, however, it is preferred to employ from about 5 to about 8 parts of oxiodinium compound for each part of hexachlorophene present in the novel synergistic combinations. Thus, typical synergistic bactericidal combinations would have present 0.05 p.p.m. of hexachlorophene and 0.25–.40 p.p.m. of the oxiodinium compound. Such combinations are then applied to, or added to, the bacterial habitat in suitable dispersions for suppression of bacterial growth thereon or therein. The amount of the synergistic combination employed will, in each instance, depend upon the sensitivity of the particular organism whose growth is to be inhibited by the application to its habitat of said compositions. The sensitivity of various bacteria to these combinations differ by a factor of a thousandfold. Among the genera of Gram positive organisms which can be inhibited by the synergistic combinations of this invention are included the pathogens, Staphylococcus, Streptococcus, Pneumococcus, and Meningococcus, and the like.

In general, as has been previously stated, the synergistic combinations of this invention are employed in aqueous media and this invention contemplates not only dispersions including solutions of the aforesaid synergistic combinations of bactericides in aqueous media, but also dry powders and concentrates adaptable for dispersion or solution in aqueous media. The dispersions in aqueous media, including true solutions, can be employed for the same purposes as were the solutions of the bactericidal compounds alone; i.e., as disinfecting agents for use in hospital wards, as inhibitors of bacterial growth in various medicinals including vitamin products, in preparations suitable for use on the human body including soaps, shampoos and the like, as disinfectants in clotheswashing operations, particularly in the washing of diapers, etc.

I claim:
1. The process for inhibiting the growth of bacterial which comprises furnishing to the bacterial habitat an aqueous dispersion containing from $5/8$ to $3/8$ of a minimum inhibitory concentration of dibenz[be][1,4]oxiodinium chloride in synergistic combination with $1/16$ to $1/4$ of a minimum inhibitory concentration of bis-(3,5,6-trichloro-2-hydroxyphenyl)methane, the sum of the fractional minimum inhibitory concentrations not to exceed 1.0.

2. The process for inhibiting the growth of bacteria which comprises furnishing to the bacterial habitat an aqueous dispersion containing from $1/2$ to $9/10$ of a minimum inhibitory concentration of 1-chloro-dibenz[be][1,4]oxiodinium chloride in synergistic combination with from $1/8$ to $1/12$ of a minimum inhibitory concentration of bis-(3,5,6-trichloro-2-hydroxyphenyl)methane, the sum of the fractional minimum inhibitory concentrations not to exceed 1.0.

3. The process for inhibiting the growth of bacteria which comprises furnishing to the bacterial habitat an aqueous dispersion containing a $5/14$ minimum inhibitory concentration of 3-chlorodibenz[be][1,4]oxiodinium chloride in synergistic combination with $1/12$ of minimum inhibitory concentration of bis-(3,5,6-trichloro-2-hydroxyphenyl) methane, the sum of the fractional minimum inhibitory concentrations not to exceed 1.0.

4. The process for inhibiting the growth of bacteria which comprises furnishing to the bacterial habitat an aqueous dispersion containing from $1/2$ to $9/10$ of a minimum inhibitory concentration of bis-(3,7-dichlorodibenz[be][1,4]oxiodinium sulfate in synergistic combination with $1/12$ of a minimum inhibitory concentration of bis-(3,5,6-trichloro-2-hydroxyphenyl)methane, the sum of the fractional minimum inhibitory concentrations not to exceed 1.0.

References Cited
UNITED STATES PATENTS 3,177,115    4/1965    Casely et al. _____ 167—31
3,244,636    4/1966    Reller et al. _____ 167—30

ALBERT T. MEYERS, Primary Examiner.

J. D. GOLDBERG, Assistant Examiner.

U.S. Cl. X.R.
424—347